United States Patent
Narayanan

(10) Patent No.: US 8,948,008 B2
(45) Date of Patent: Feb. 3, 2015

(54) DROP SENSITIVE PREFIX (BGP PATH) ATTRIBUTE MODIFICATION

(75) Inventor: Mahesh Narayanan, Ashburn, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 158 days.

(21) Appl. No.: 13/566,176

(22) Filed: Aug. 3, 2012

(65) Prior Publication Data

US 2014/0036663 A1 Feb. 6, 2014

(51) Int. Cl.
*H04L 12/24* (2006.01)

(52) U.S. Cl.
USPC ............................................. 370/230

(58) Field of Classification Search
CPC ......... H04L 47/10; H04L 47/30; H04L 47/12; H04L 2012/5631; H04L 47/15; H04L 47/2441; H04L 47/70
USPC ......................................... 370/230, 229, 231
See application file for complete search history.

(56) References Cited

U.S. PATENT DOCUMENTS

| 7,886,023 B1 * | 2/2011 | Johnson ......................... 709/219 |
| 2002/0078223 A1 | 6/2002 | Baldonado et al. |
| 2002/0095493 A1 * | 7/2002 | Byrnes ........................... 709/224 |
| 2007/0047446 A1 * | 3/2007 | Dalal et al. ..................... 370/237 |
| 2007/0064715 A1 | 3/2007 | Lloyd et al. |
| 2011/0058477 A1 * | 3/2011 | Kwan et al. .................... 370/235 |
| 2011/0138404 A1 * | 6/2011 | Bello et al. ..................... 719/330 |

OTHER PUBLICATIONS

European Search Report from corresponding European Patent Application No. 13156797.6, mailed May 16, 2013 (8 pgs.).

J. Uttaro, et al, "Best Practices for Advertisement of Multiple Paths in IBGP: draft-ietf-idr-add-paths-guidelines-02.txt" (Internet Engineering Task Force, ETF; StandardWorkingDraft, Internet Society (ISOC) 4, Rue des Falaises CH—1205 Geneva Switzerland, Nov. 25, 2011), pp. 1-22.

Communication pursuant to Article 94(3) EPC from corresponding European Patent Application No. 13156797.6-1804, mailed Oct. 14, 2014 (4 pgs.).

* cited by examiner

*Primary Examiner* — Andrew Lai
*Assistant Examiner* — Zhiren Qin
(74) *Attorney, Agent, or Firm* — John C. Pokotylo; Straub & Pokotylo

(57) ABSTRACT

In a system including a first autonomous system (AS) configured to have a first gateway router forward data associated with a set of IP address prefixes, to a second AS via a link to a first eBGP peer device of the second AS, the problem of data packets dropped at an output of the first gateway router while the link is still "up" and an eBGP session between the first gateway router and the first eBGP peer is still up, is solved by (1) receiving information about dropped data packets at an output of the first gateway router, (2) determining whether a data traffic offload condition exists using the received information, (3) changing path attribute(s) of at least some of the IP address prefixes of the set if a data traffic offload condition exists, such that the first gateway router will be less likely to forward data associated with those IP address prefixes, and (4) generating a BGP update message including the changed path attribute(s) for communication to at least one iBGP peer device in the first AS.

20 Claims, 10 Drawing Sheets

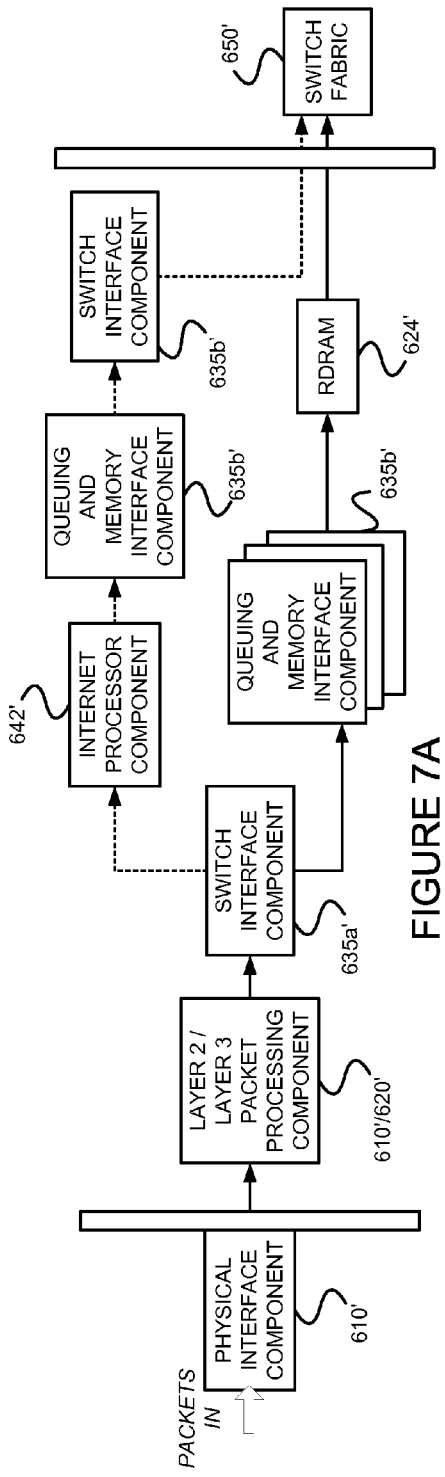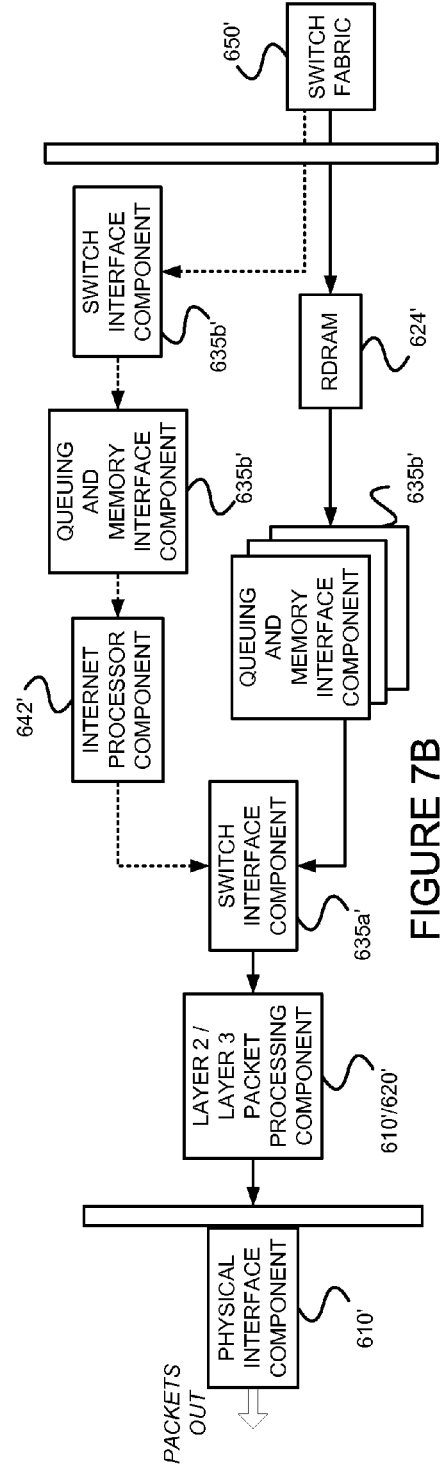

DROP SENSITIVE PREFIX (BGP PATH) ATTRIBUTE MODIFICATION

§1. BACKGROUND OF THE INVENTION

§1.1 Field of the Invention

The present invention concerns communications networks. More specifically, the present invention concerns improving data transport services provided by a first autonomous system (AS) of a communications network to a second autonomous system of the communications network.

§1.2 BACKGROUND INFORMATION

In traditional Internet service providers (ISPs), a peering relationship between a Service Provider and an Enterprise Customer (e.g., between Verizon and WellsFargo Bank), or, between two Service Providers themselves (e.g., between Verizon and AT&T) (or more generally, between a first autonomous system (AS) and a second autonomous system (AS)), is predominantly via a point-to-point external border gateway protocol (eBGP) link. (The current version of the border gateway protocol is described in IETF RFC 4271, which is incorporated herein by reference.) Many times, these point-to-point links (e.g., a 1 Gbps link, a 10 Gbps line, or any other speed link) become congested with too much data (also referred to as "running hot"). This may occur, for example, because of a distributed denial of service (DDoS) attack, the customer inadvertently DDoSing itself, poor routing or a failure of certain paths in the networks.

When eBGP links become too congested, there are often many packets dropped at the egress of the service provider on the given link (e.g., at a gateway router of the service provider sharing a link with a customer device). In many router operating systems (such as JUNOS provided in routers by Juniper Networks, Inc. of Sunnyvale, Calif.), control packets of the BGP protocol are programmed such that BGP transmissions or retransmissions are transmitted over a higher priority queue (Queue-3/Network Control queue for BGP TCP retransmissions) than for normal data transmissions (which typically use a "best efforts" queue"). The reason for this implementation is to keep the BGP peering session up by protecting the control packets in cases where the link is getting congested. Consequently, although route-exchange, sessions establishment and maintenance under the BGP protocol happen over a higher priority queue, data packets (as opposed to control packets), by default, get implemented in the best effort queue (or get implemented on a queue that has lower priority than the higher priority queue of the control packets). Thus, control packets (e.g., BGP peering packets) will be communicated with higher priority over data packets. Consequently, even as data packets are dropped, the BGP peering session might not be aware of this because its packets (which are control packets, not data packets) are not dropped and the BGP session itself stays up Dropped data packets lead to a poor experience for the ISP's enterprise customer (or for a second AS having a peering relationship with a first AS).

BGP dampening, as described in IETF RFC 2439 (incorporated herein by reference), prevents oscillations when a BGP session is flapping (i.e., going down and coming back up, often multiple times). However, BGP dampening is invoked only when a BGP session itself is flapping, in which case BGP damping penalizes the particular BGP session that is flapping. Unfortunately, BGP flapping might not occur in scenarios where the link is running hot and data packets are being dropped. Again, this is because the control packets of the BGP session are given priority over data packets and the BGP session is not going down. That is, BGP damping won't even be invoked in scenarios where there are output drops due to link congestion, but no BGP session flap.

Referring to FIG. 1, consider an example environment 100 in which an ISP 110 has two of its Gateway (GW) routers 120a, 120b having eBGP peering sessions with customer edge devices 140a, 140b of the same Enterprise customer 130. The ISP 110 advertises the network address prefixes of the customer 130 internally to its other GW routers (e.g., 120c) through internal BGP (iBGP). In accordance with BGP, the GW router 2 120b is used as the primary gateway for the Enterprise Customer's network address prefixes, while the GW router 1 120a is available as the backup. This selection or configuration may be based on BGP path attributes such as local preference (LP), AS path, origin, etc. In this example, assume that BGP selects the GW router with the highest local preference (LP) value for a given network address prefix as the primary gateway for that prefix. In FIG. 1, since the GW router 2 120b has a higher local preference value than that of GW router 1 120a for all of the network address prefixes of the customer 130 (120>100), assume that BGP uses GW router 2 120b as the primary gateway for the network address prefixes of customer 130, while GW router 1 120a is available as the backup gateway.

Assume that the link 115b between the primary GW router 120b and the customer edge device (e.g., customer router) 140b is experiencing congestion, and many data packets are being dropped at the output (e.g., the output queue) of the GW router 2 120b. Unfortunately, the ISP 110 will not see (and be able to address) this problem quickly, unless it is monitoring the link 115b. Typically, the ISP 110 will soon start getting complaints from its customer 130 about applications failing, call drops, and all other problems that occur for the customer 130 when data packets addressed to its prefixes are dropped. The ISP's 110 customer 130 is not going to be satisfied with such a situation. Typically, the customer 130 is going to report these problems to the ISP's 110 network operations center (NOC). It is only after the customer 130 has become upset enough to contact the ISP 110 does the ISP learn of the problem!

The ISP 110 would only then realize that there might be a DDoS issue, or that the customer 130 is DDoSing itself. At the ISP 110, if the problem cannot be handled by lower level personnel (e.g., at Tier 1), the problem ticket gets escalated to higher level personnel (e.g., at Tier 2, or higher) until personnel with the appropriate skill set and authority can rectify the problem. Depending on their proficiency, the NOC might mitigate the problem of dropped data packets on the congested link 115b by changing one or more BGP path attributes such that the link 115b between the primary GW router 120b and the customer edge device 140b becomes less preferred. Unfortunately, however, this solution wastes time and leads to decreased customer 130 satisfaction with the ISP 110, especially since this solution is slow and reactive to receiving a complaint from the customer 110. This is particularly unfortunate given that the backup GW router 1 120a and link 115a were available the whole time, but were not utilized due to BGP selecting the congested, primary path based on its BGP path attributes (e.g., local preferences in this example).

Scheduling and load balancing techniques such as multi-path are used to avoid congestion, and are typically implemented at the ingress (e.g., GW router 3 120c of FIG. 1), not at the egress. Although scheduling permits some data packets to get a higher priority than other data packets, control packets almost always get the highest priority. Therefore, at best, some data packets (if any) in the same queue priority as that of the control packets get protected. Unfortunately, however, data packets in the other queues may be dropped, leading to a poor customer experience. Multipath, in essence, tries to use both of the links simultaneously. However, multipath is static and fixed in nature. It predetermines the traffic that will use one link versus the other, and because of this, unforeseen problems cannot be solved completely. A solution that is dynamic in nature, and that tries to balance traffic responsive to the detection of a problem may be desirable.

As should be appreciated from the foregoing, in a network environment in which a first AS configured to have a first GW router forward data associated with a set of one or more IP address prefixes, to a second AS system via a first link to a first eBGP peer device of the second AS, the first AS having a second GW router capable of forwarding data to the second AS system via a second link to a (e.g., the same, or another) eBGP peer device of the second AS, it would be useful to provide an improved solution to the problem of data packets dropped at an output (e.g., egress) of the first GW router while the first link between the first GW router and the first eBGP peer device of the second AS is still "up" and while an eBGP session between the first GW router and the first eBGP peer is still up. It would be useful if the solution avoided the need of a manually implemented, reactive, fix. It would be useful if the solution is invoked before the dropped data packets become very apparent to the customer. It would be useful if the solution notifies the service provider and prompts them to take proactive action, or if the solution takes the proactive action itself. It would also be useful if the solution lets the enterprise customer use its redundant path more effectively to increase the return on investment value for the enterprise customer.

§2. SUMMARY OF THE INVENTION

In a first AS configured to have a first GW router forward data associated with a set of one or more IP address prefixes, to a second AS system via a first link to a first border device of the second AS, the first AS having a second GW router capable of forwarding data to the second AS system via a second link to a (e.g., the same, or another) border device of the second AS, the problem of data (e.g., packets, cells, etc.) dropped at an output (e.g., egress interface or port, sometimes referred to as an egress, or edge, or GW, peer point) of the first GW router while the first link between the first GW router and the first border device of the second AS is still "up", is solved by (1) receiving information about dropped data at the output of the first GW router; (2) determining whether a "data traffic offload" condition exists using the received information; (3) changing one or more attributes of at least some of the one or more of the IP address prefixes of the set, responsive to a determination that a "data traffic offload" condition exists, such that the first GW router will be less likely to forward data associated with the at least some of the one or more IP address prefixes of the set; and (4) outputting the changed one or more attributes for communication to at least one other router of the first AS.

In the context of an AS using iBGP and eBGP peering, in a first AS configured to have a first GW router forward data associated with a set of one or more IP address prefixes, to a second AS system via a first link to a first eBGP peer device of the second AS, the first AS having a second GW router capable of forwarding data to the second AS system via a second link to a (e.g., the same, or another) eBGP peer device of the second AS, the problem of data packets dropped at an output of the first GW router while the first link between the first GW router and the first eBGP peer device of the second AS is still "up" and while an eBGP session between the first GW router and the first EBGP peer is still up, is solved by (1) receiving information about dropped data packets at the output of the first GW router; (2) determining whether a "data traffic offload" condition exists using the received information; (3) changing one or more path attributes of at least some of the one or more of the IP address prefixes of the set, responsive to a determination that a "data traffic offload" condition exists, such that the first GW router will be less likely to forward data associated with the at least some of the one or more IP address prefixes of the set; and (4) generating a BGP update message including the changed one or more path attributes for communication to at least one iBGP peer device in the first AS.

§3. BRIEF DESCRIPTION OF THE DRAWINGS

FIGS. 7A and 7B illustrate example packet forwarding operations of the example distributed ASICs of FIG. 6.

§4. DETAILED DESCRIPTION

The present invention may involve novel methods, apparatus, message formats, and/or data structures for avoiding or reducing dropped data packets at an output of a first GW router while a first link between the first GW router and a first eBGP peer device of a second AS is still "up", and while an eBGP session between the first GW router and the first eBGP peer is still up. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act.

Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

§4.1 Example Methods

Figure 2:
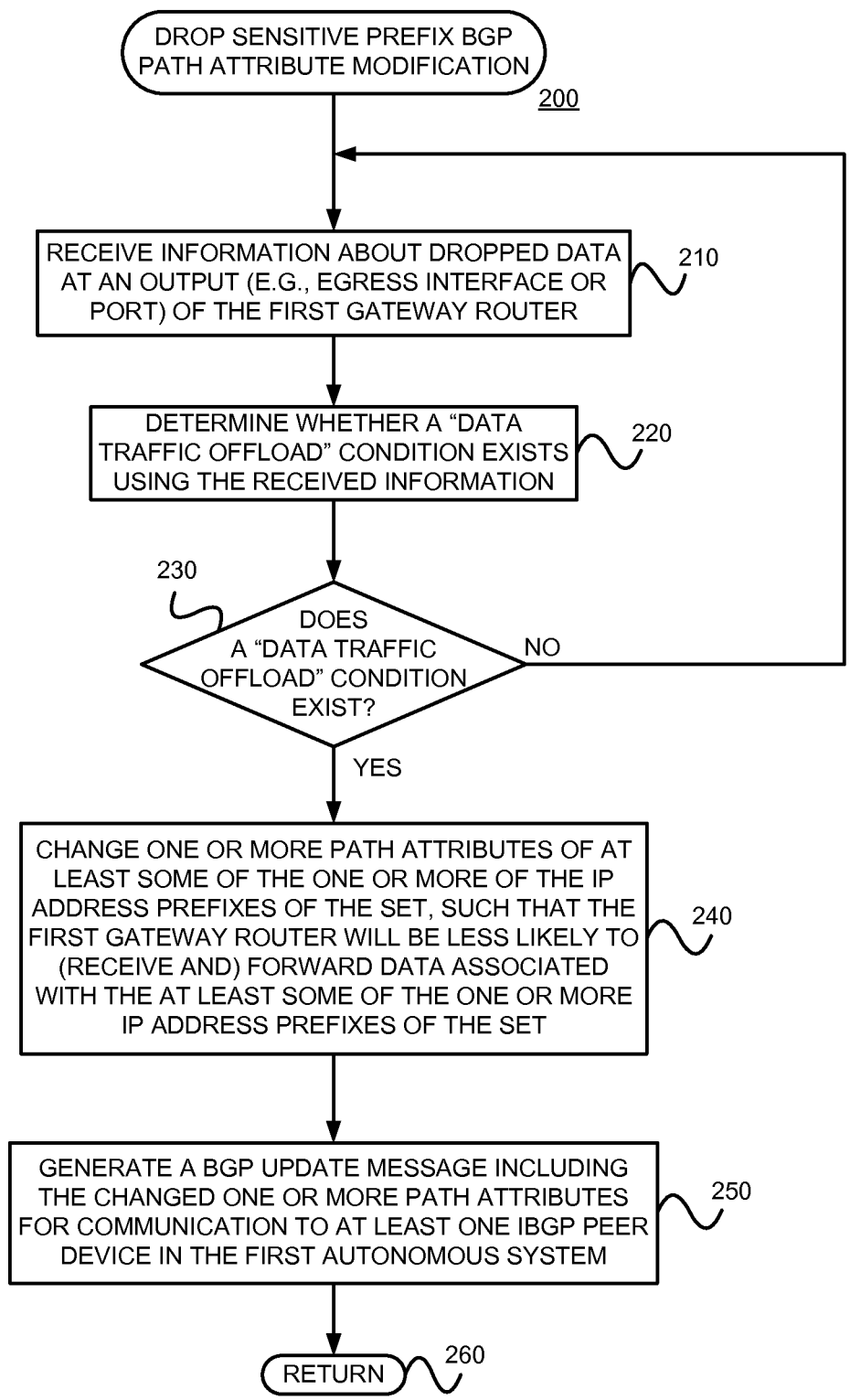
FIG. 2 is a flow diagram of an example method for providing a drop-sensitive prefix BGP path attribute modification.

FIG. 2 is a flow diagram of an example method 200 for providing a drop-sensitive prefix BGP path attribute modification in a system including a first AS configured to have a first GW router forward data associated with a set of one or more IP address prefixes, to a second AS system via a first link to a first eBGP peer device of the second AS. As shown, the example method 200 includes receiving information about dropped data packets at an output of the first GW router. (Block 210). Then, it is determined whether a "data traffic offload" condition exists using the received information. (Block 220) If it is determined that a "data traffic offload" condition does not exist, then the method 200 branches back to block 210. (NO branch of Condition 230). Otherwise, responsive to a determination that a "data traffic offload" condition exists, one or more BGP path attributes of at least some of the one or more of the IP address prefixes of the set are changed such that the first GW router will be less likely to forward data associated with the at least some of the one or more IP address prefixes of the set (YES branch of Condition 230 and Block 240), and a BGP update message including the changed one or more path attributes is generated for communication to at least one iBGP peer device in the first AS (Block 250), before the method 200 is left (Node 260).

In some example implementations, the first autonomous system is an Internet service provider and wherein the second autonomous system is a customer of the Internet service provider. In other example implementations, the peers are both Internet service providers.

Referring back to block 240, in some example embodiments, the act of changing one or more path attributes of at least some of the one or more of the IP address prefixes of the set such that the first GW router will be less likely to forward data associated with the at least some of the one or more IP address prefixes of the set includes (A) changing a local preference BGP path attribute of at least some of the one or more of the IP address prefixes of the set, (B) decreasing a local preference BGP path attribute of at least some of the one or more of the IP address prefixes of the set, and/or (C) changing at least one of (i) an AS path BGP path attribute, (ii) an origin BGP path attribute, and/or (iii) a communities BGP path attribute, of at least some of the one or more of the IP address prefixes of the set.

Some example methods may further include generating the received information about dropped data packets at an output of the first gateway router. Some example methods may generate the received information using an interface statistics counter. Other example methods may generate the received information using a management information base (MIB) of a simple network management protocol (SNMP).

Referring back to block 220, in some example methods, the act of determining whether a "data traffic offload" condition exists using the received information includes determining whether (A) a measured dropped packet per time period value, or (B) a measured dropped byte per time period value, included in the received information, exceeds a predetermined parameter. In some such example methods, (A) the measured dropped packet per time period value, or (B) the measured dropped byte per time period value, may be taken from an output queue of the first GW router. In other such example methods, (A) the measured dropped packet per time period value, or (B) the measured dropped byte per time period value, may be taken from an output interface of the first GW router.

In some example methods, the at least some of the one or more of the IP address prefixes of the set consist of a predetermined number of the one or more IP address prefixes. In other example methods, the at least some of the one or more of the IP address prefixes of the set consist of a predetermined percentage of the one or more IP address prefixes.

In some example methods, the at least some of the one or more of the IP address prefixes of the set are selected randomly. In other example methods, the at least some of the one or more of the IP address prefixes of the set are selected in accordance with a predefined heuristic. In such example methods, the predefined heuristic may consider the amount of traffic destined (or dropped) for each of the IP address prefixes of the set.

The example method 200 may be performed locally, on the first GW router. In other example methods, at least the act of changing one or more path attributes of at least some of the one or more of the IP address prefixes of the set, responsive to a determination that a "data traffic offload" condition exists, such that the first GW router will be less likely to forward data associated with the at least some of the one or more IP address prefixes of the set, is performed by a centralized control unit external to the first GW router.

Finally, the example method 200 may further include sending, by the first GW router, a packet drop sensitive BGP attribute as a BGP capability to an iBGP peer.

As should be appreciated from the foregoing, BGP may be used to monitor factors like congestion and drops on the link over which the eBGP session is established with the customer. When the BGP process finds that the link quality has degraded, it may then feed this data to the prefixes learned over this eBGP session. BGP may then modify the attributes of some of the prefixes so as to make them less preferable. The method may be iterative in nature such that, if after a first iteration, a "data traffic offload" condition still exists, the attribute modification process may be repeated. The goal is to make the GW router less preferable for certain routes, shifting some of the data traffic to another (e.g., redundant, secondary) link, thereby alleviating the problem.

For example, an example BGP process would first resolve the next-hop of the eBGP peering IP address on which the method is configured. The result of this resolution would provide the BGP with an ifl index (e.g., an interface index that maps virtual interfaces to physical interfaces). Using a data input mechanism (e.g., interface statistics counters, SNMP MIBS, etc.), BGP can monitor the output drops/queues to ascertain the quality of the link to determine whether a "data traffic offload" condition exists. The "data traffic offload" condition can be a user configurable parameter in terms of packets or bytes per second drop (e.g., 100 Mpps drops, 500 Mpps drops, etc). Based on this configured parameter, once it is detected that the quality of the link has degraded to an unacceptable degree, BGP can take different mitigating and/or notification actions. These actions can be made user configurable to modify different BGP path attributes like changing the local preference (LP), origin, AS path, communities, logging/alarming, etc. The BGP path attribute modification should be done on a subset of prefixes—doing it on all the prefixes would likely just move the problem to a different node. The number of such prefixes can again be made user configurable like a set percentage of prefixes learned, or a fixed value (similar to the throughput/queue setting knobs in Class-of-Service (CoS) in the JUNOS operating system provided on routers from Juniper Networks of Sunnyvale, Calif.). The selection of such prefixes itself can also be made user configurable (e.g., choose the first or last 10 of the prefixes, choose prefixes only in a particular subnet, choose all prefixes except in subnet, choose the prefixes randomly, etc.).

A sample commercial line interface (CLI) implementation template is shown in the following:

```
#neighbor <X> {
    BGP drop-sensitive {
            if {
                threshold <queue-drop pps, queue-drop bps> {
                adjust <local-preference (add,set,delete), MED
(add,set,delete), community (add,set,delete), as_path (add,set,delete)>;
                log;
                number-of-prefixes <percentage, fixed value>;
                    choose-prefixes <random-order, top-to-bottom,
bottom-to-top>;
                    number-of-pass <1-100> {this is an iteration
counter, which is used to avoid any loop or uncontrolled oscillations in
control)
                }
            }
    }
}
```

Figure 3:
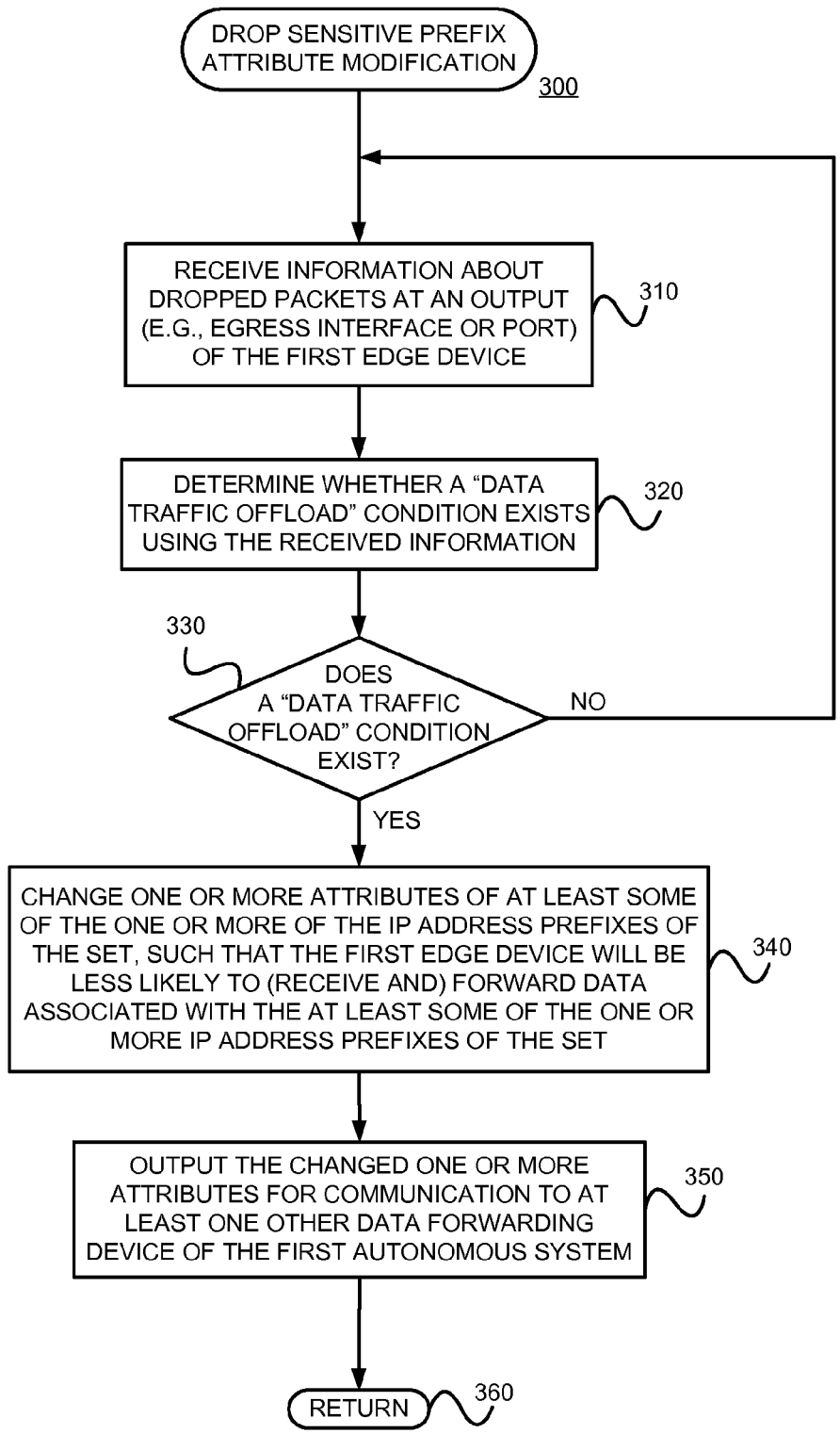
FIG. 3 is a flow diagram of an example method for providing a drop-sensitive prefix attribute modification.

FIG. 3 is a flow diagram of an example method 300 for providing a drop-sensitive prefix attribute modification in a system including a first AS configured to have a first edge device (e.g., a GW router) forward data associated with a set of one or more IP address prefixes, to a second AS system via a first link to a first border device of the second AS. As shown, the example method 300 includes receiving information about dropped data at the output of the first edge device. (Block 310) Then, it is determined whether a "data traffic offload" condition exists using the received information. (Block 320) If it is determined that a "data traffic offload" condition does not exist, then the method 300 branches back to block 310. (NO branch of Condition 330). Otherwise, responsive to a determination that a "data traffic offload" condition exists, the method 300 changes one or more attributes of at least some of the one or more of the IP address prefixes of the set such that the first edge device will be less likely to forward data associated with the at least some of the one or more IP address prefixes of the set (YES branch of Condition 330 and Block 340), the changed one or more attributes is output for communication to at least one other data forwarding device (e.g., router) of the first AS (Block 350), and the method 300 is left (Node 360).

In some example implementations, the first autonomous system is an Internet service provider and wherein the second autonomous system is a customer of the Internet service provider. In other example implementations, the peers are both Internet service providers.

Some example methods may further include generating the received information about dropped data packets at an output of the first edge device. Some example methods may generate the received information using an interface statistics counter. Other example methods may generate the received information using a management information base (MIB) of a simple network management protocol (SNMP).

Referring back to block 320, in some example methods, the act of determining whether a "data traffic offload" condition exists using the received information includes determining whether (A) a measured dropped packet per time period value, or (B) a measured dropped byte per time period value, included in the received information exceeds a predetermined parameter. In some such example methods, (A) the measured dropped packet per time period value, or (B) the measured dropped byte per time period value, may be taken from an output queue of the first edge device. In other such example methods, (A) the measured dropped packet per time period value, or (B) the measured dropped byte per time period value, may be taken from an output interface of the first edge device.

In some example methods, the at least some of the one or more of the IP address prefixes of the set consist of a predetermined number of the one or more IP address prefixes. In other example methods, the at least some of the one or more of the IP address prefixes of the set consist of a predetermined percentage of the one or more IP address prefixes.

In some example methods, the at least some of the one or more of the IP address prefixes of the set are selected randomly. In other example methods, the at least some of the one or more of the IP address prefixes of the set are selected in accordance with a predefined heuristic. In such example methods, the predefined heuristic may consider the amount of traffic destined (or dropped) for each of the IP address prefixes of the set.

The example method 300 may be performed locally, on the first edge device. In other example methods, at least the act of changing one or more path attributes of at least some of the one or more of the IP address prefixes of the set, responsive to a determination that a "data traffic offload" condition exists, such that the first edge device will be less likely to forward data associated with the at least some of the one or more IP address prefixes of the set, is performed by a centralized control unit external to the first edge device.

§4.2 Example Nodes and Routers

Figure 4:
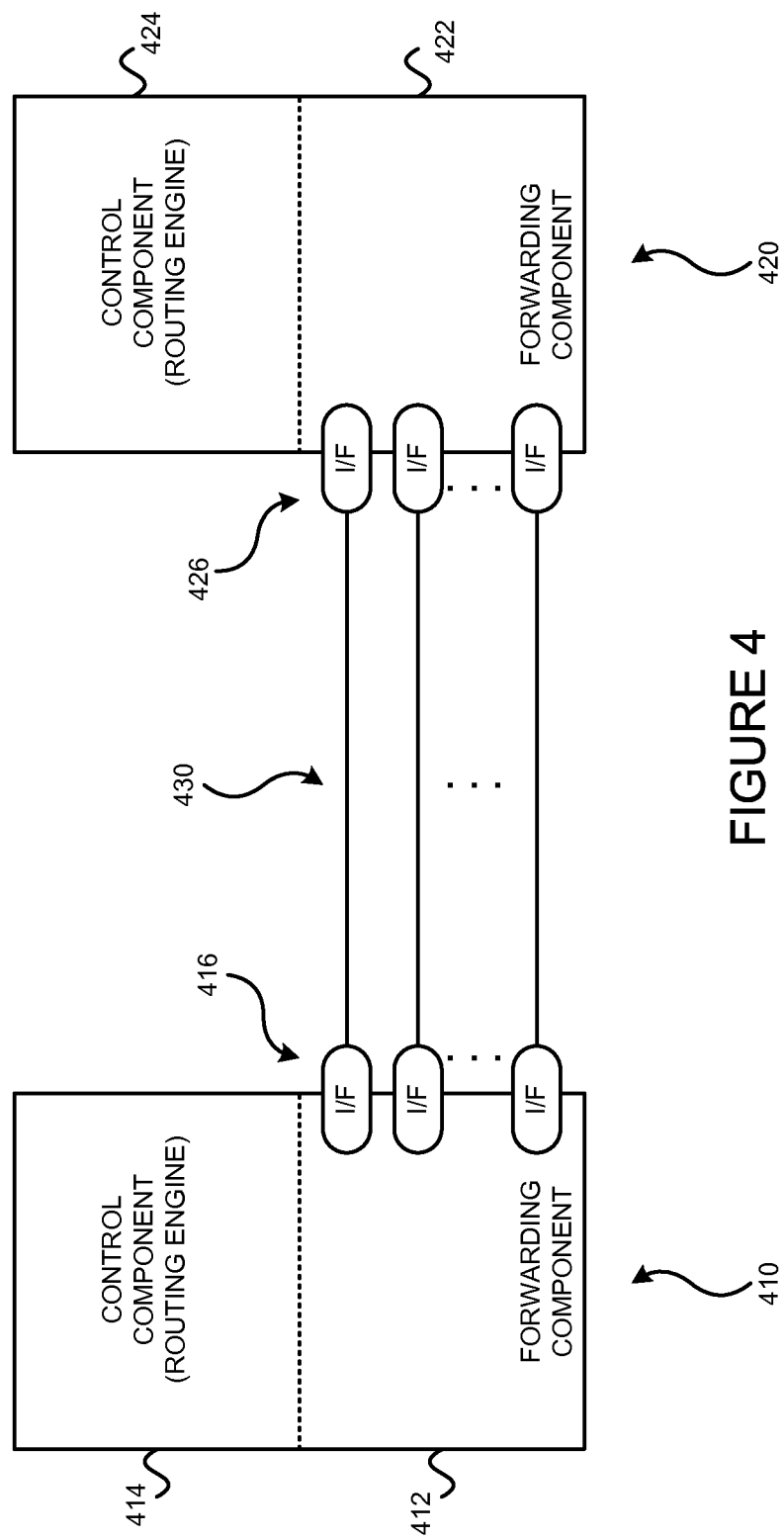
FIG. 4 illustrates an environment including two systems coupled via communications links.

FIG. 4 illustrates two data forwarding systems 410 and 420 coupled via communications links 430. The links may be physical links or "wireless" links. The data forwarding systems 410,420 may be routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process (es) 550, user interface (e.g., command line interface) process (es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol (RIP) 531, the intermediate system-to-intermediate system protocol (IS-IS) 532, the open shortest path first protocol (OSPF) 533, the enhanced interior gateway routing protocol (EIGRP) 534 and the boarder gateway protocol (BGP) 535, and the label-based forwarding protocol process(es) 540 may support protocols such as BGP 535, the label distribution protocol (LDP) 536 and the resource reservation protocol (RSVP) 537. One or more components (not shown) may permit a user 565 to interact with the user interface process(es) 560. Similarly, one or more components (not shown) may permit an external device to interact with one or more of the router protocol process(es) 530, the label-based forwarding protocol process(es) 540, the interface process(es) 550, and the chassis process(es) 570, via SNMP 585, and such processes may send information to an external device via SNMP 585.

The packet forwarding component 590 may include a microkernel 592, interface process(es) 593, distributed ASICs 594, chassis process(es) 595 and forwarding (e.g., route-based and/or label-based) table(s) 596.

Figure 5:
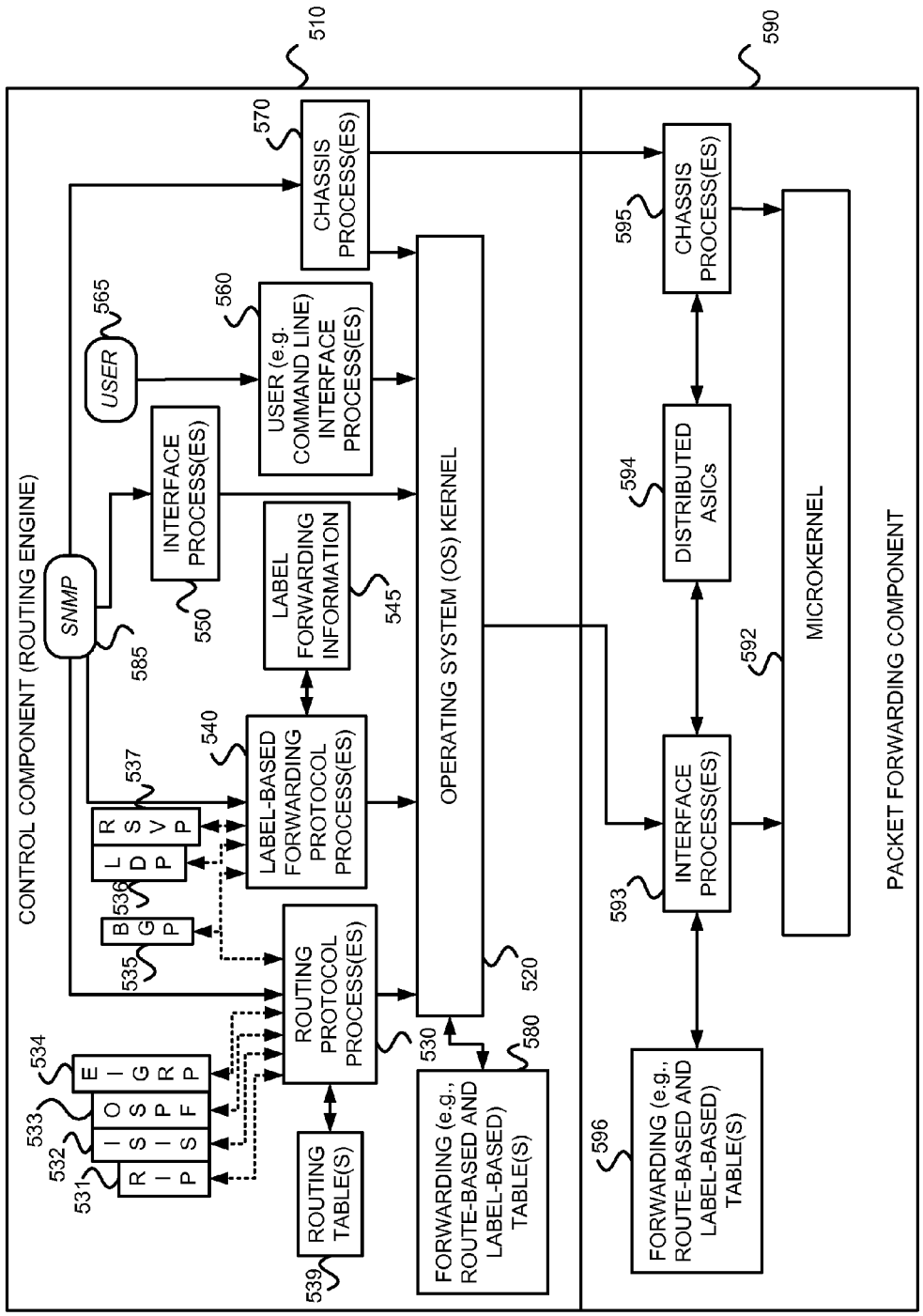
FIG. 5 is a block diagram of an example router on which the present invention may be implemented.

In the example router 500 of FIG. 5, the control component 510 handles tasks such as performing routing protocols, performing label-based forwarding protocols, control packet processing, etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface (API) system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536 and RSVP 537 (and BGP 535) protocols are provided. Naturally, other label-based forwarding protocols (e.g., MPLS) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces (Recall, e.g., 416 and 426 of FIG. 4.) and encapsulation.

The example control component 510 may provide several ways to manage the router. For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager (HP-NNM), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface (CLI) 560 via a console port, an auxiliary port, and/or a management Ethernet port The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592, interface process(es) 593, distributed ASICs 594, and chassis process(es) 595, and stores a forwarding (e.g., route-based and/or label-based) table(s) 596. The microkernel 592 interacts with the interface process(es) 593 and the chassis process(es) 595 to monitor and control these functions. The interface process (es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs 594. Finally, the chassis process (es) 595 may communicate directly with the microkernel 592 and with the distributed ASICs 594.

Figure 6:
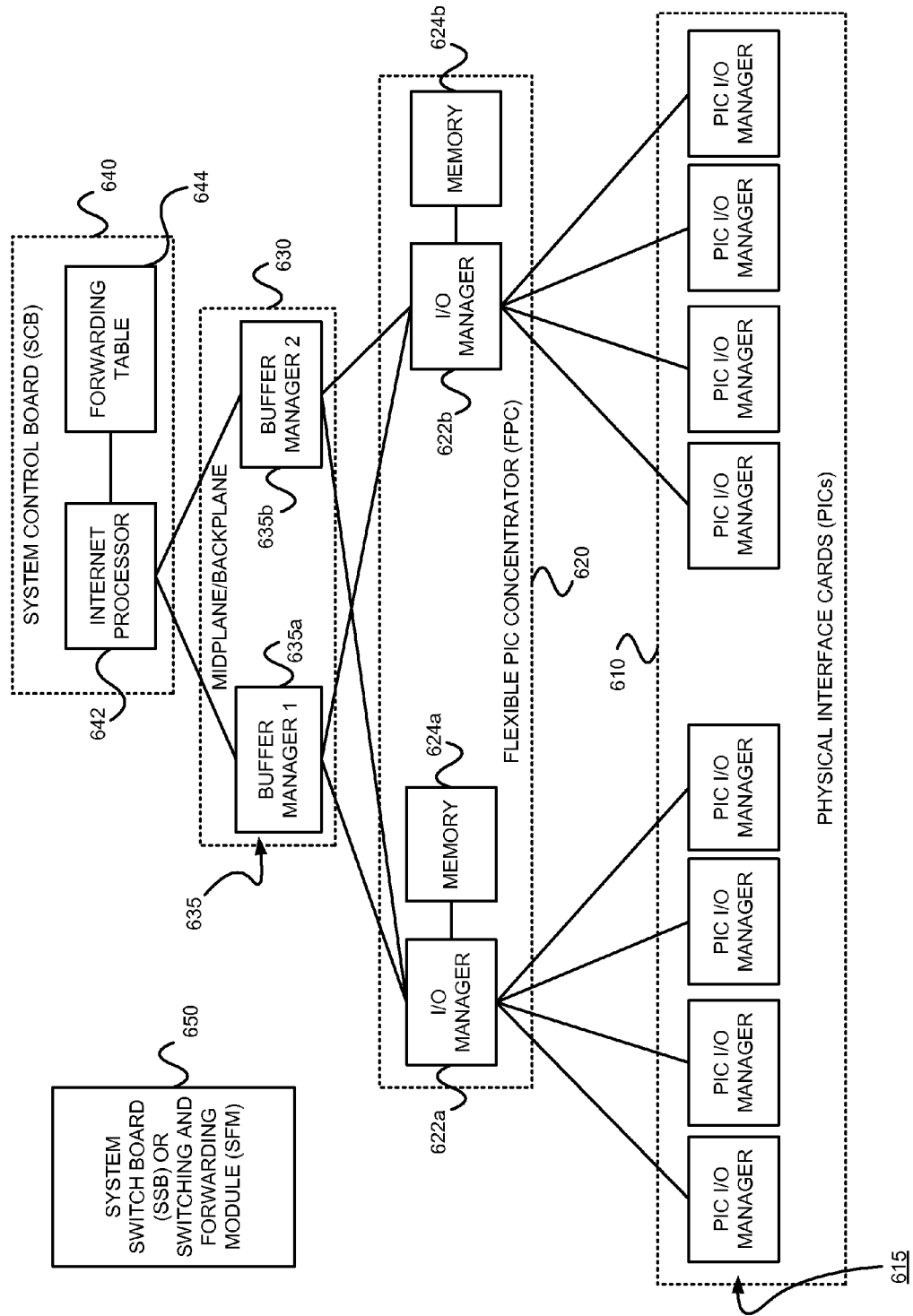
FIG. 6 is a block diagram of example distributed application specific integrated circuits (ASICs) that may be provided in the example router of FIG. 5.

Referring back to distributed ASICs 594 of FIG. 5, FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards (PICs) 610, flexible PIC concentrators (FPCs) 620, a midplane or backplane 630, and a system control board(s) 640 (for switching and/or forwarding). Switching fabric is also shown as a system switch board (SSB), or a switching and forwarding module (SFM) 650. Each of the PICs 610 includes one or more PIC I/O managers 615. Each of the FPCs 620 includes one or more I/O managers 622, each with an associated memory 624. The midplane/backplane 630 includes buffer managers 635*a*, 635*b*. Finally, the system control board 640 includes an internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain from one or more PICs 610, and may carry the signals from the PICs 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,610' contains at least one I/O manager ASIC 615 responsible for media-specific tasks, such as encapsulation. The packets pass through these I/O ASICs on their way into and out of the router. The I/O manager ASIC 615 on the PIC 610,610' is responsible for managing the connection to the I/O manager ASIC 622 on the FPC 620, 620', managing link-layer framing and creating the bit stream, performing cyclical redundancy checks (CRCs), and detecting link-layer errors and generating alarms, when appropriate. The FPC 620 includes another I/O manager ASIC 622. This ASIC 622 takes the packets from the PICs 610 and breaks them into (e.g., 64-byte) memory blocks. This FPC I/O manager ASIC 622 sends the blocks to a first distributed buffer manager (DBM) 635*a'*, decoding encapsulation and protocol-specific information, counting packets and bytes for each logical circuit, verifying packet integrity, and applying class of service (CoS) rules to packets. At this point, the packet is first written to memory. More specifically, the example DBM ASIC 635*a'* manages and writes packets to the shared memory 624 across all FPCs 620. In parallel, the first DBM ASIC 635*a'* also extracts information on the destination of the packet and passes this forwarding-related information to the Internet processor 642/642'. The Internet processor 642/642' performs the route lookup using the forwarding table 644 and sends the information over to a second DBM ASIC 635*b'*. The Internet processor ASIC 642/642' also collects exception packets (i.e., those without a forwarding table entry) and sends them to the control component 510. The second DBM ASIC 635*b'* then takes this information and the 64-byte blocks and forwards them to the I/O manager ASIC 622 of the egress FPC 620/620' (or multiple egress FPCs, in the case of multicast) for reassembly. (Thus, the DBM ASICs 635*a'* and 635*b'* are responsible for managing the packet memory 624 distributed across all FPCs 620/620', extracting forwarding-related information from packets, and instructing the FPC where to forward packets.)

The I/O manager ASIC 622 on the egress FPC 620/620' may perform some value-added services. In addition to incrementing time to live (TTL) values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/620' may be responsible for receiving the blocks from the second DBM ASIC 635*b'*, incrementing TTL values, queuing a pointer to the packet, if necessary, before applying CoS rules, re-encapsulating the blocks, and sending the encapsulated packets to the PIC I/O manager ASIC 615.

Figure 8:
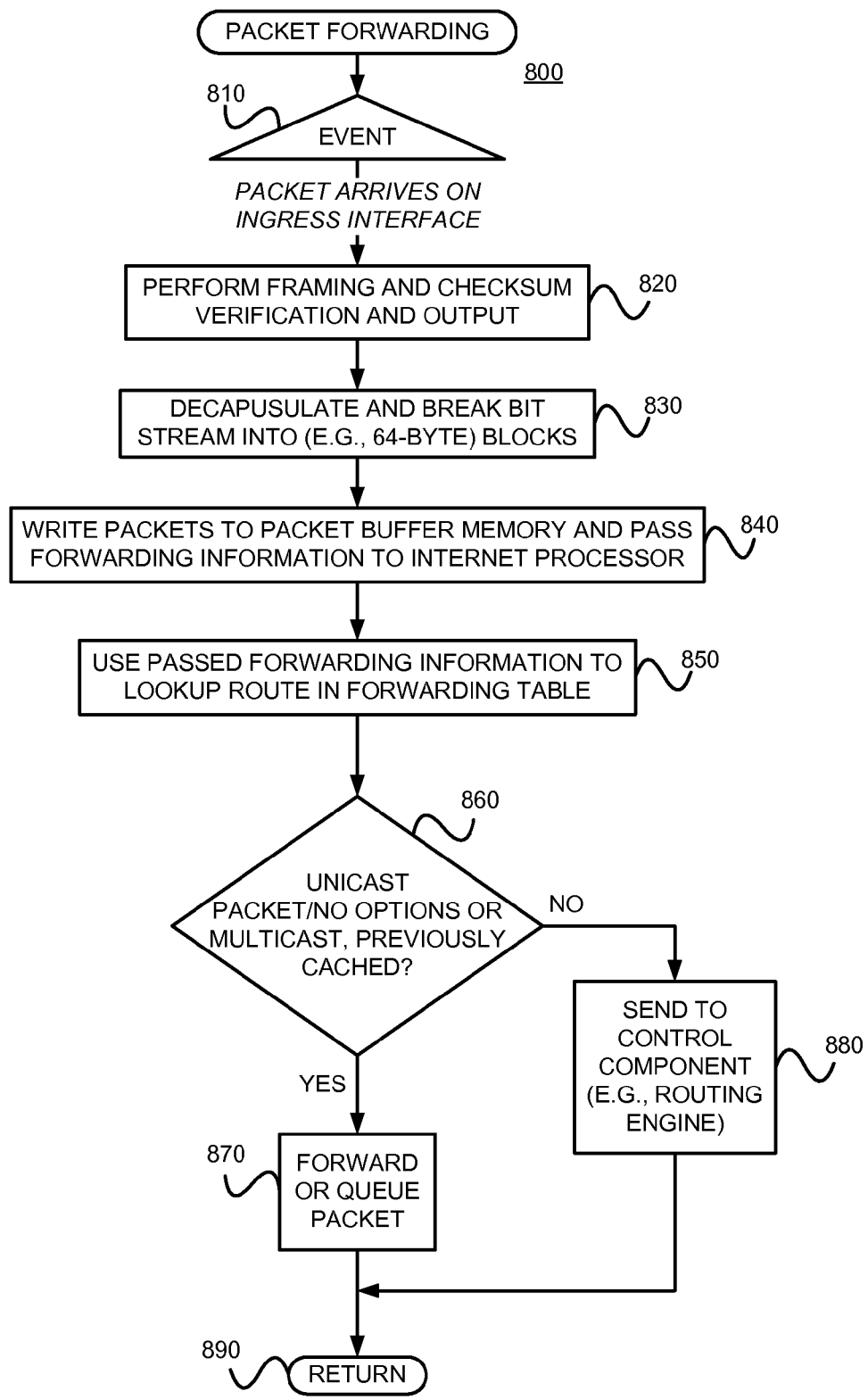
FIG. 8 is a flow diagram of an example packet forwarding method that may be implemented on any of the example routers of FIGS. 5 and 6.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635*b*. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present invention may be implemented on the example routers of FIG. 4 or 5 (See especially the BGP routing protocol 535 of FIG. 5.), embodiments consistent with the present invention may be implemented on communications network nodes (e.g., routers, switches, etc.) having different architectures. More generally, embodiments consistent with the present invention may be implemented on an example system 900 as illustrated on FIG. 9.

Figure 9:
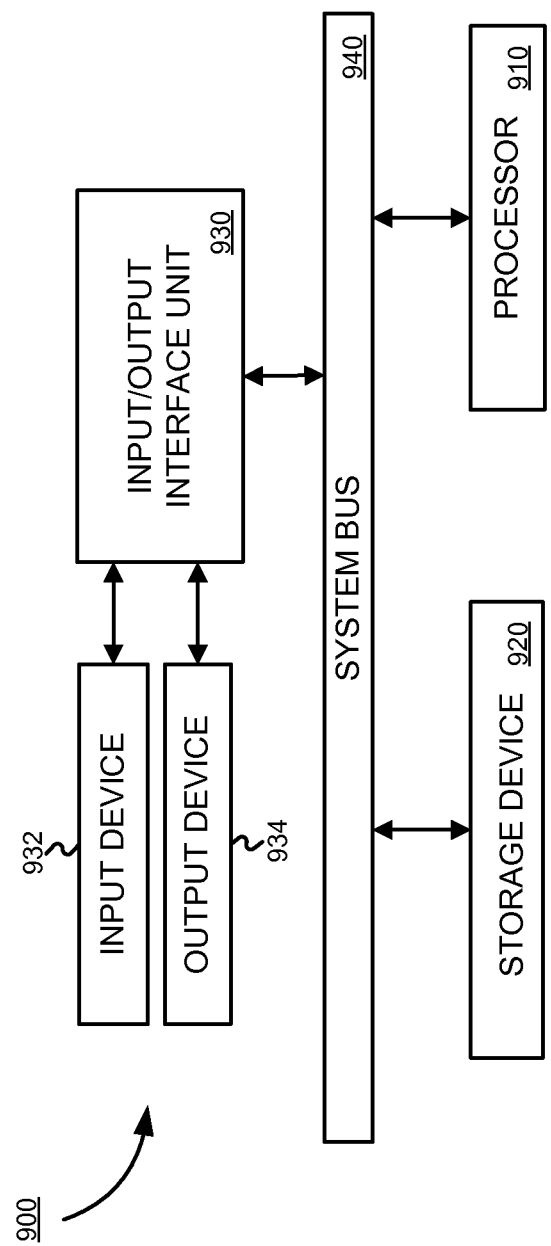
FIG. 9 is a block diagram of an example processor-based system which may be use to execute the example methods for providing a drop-sensitive prefix attribute modification and/ or to store information used and/or generated by such example methods.

FIG. 9 is a block diagram of an exemplary machine 900 that may perform one or more of the processes described, and/or store information used and/or generated by such processes. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components of the invention.

In some embodiments consistent with the present invention, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§4.3 Example Illustrating Operations in an Example Embodiment

Figure 1:
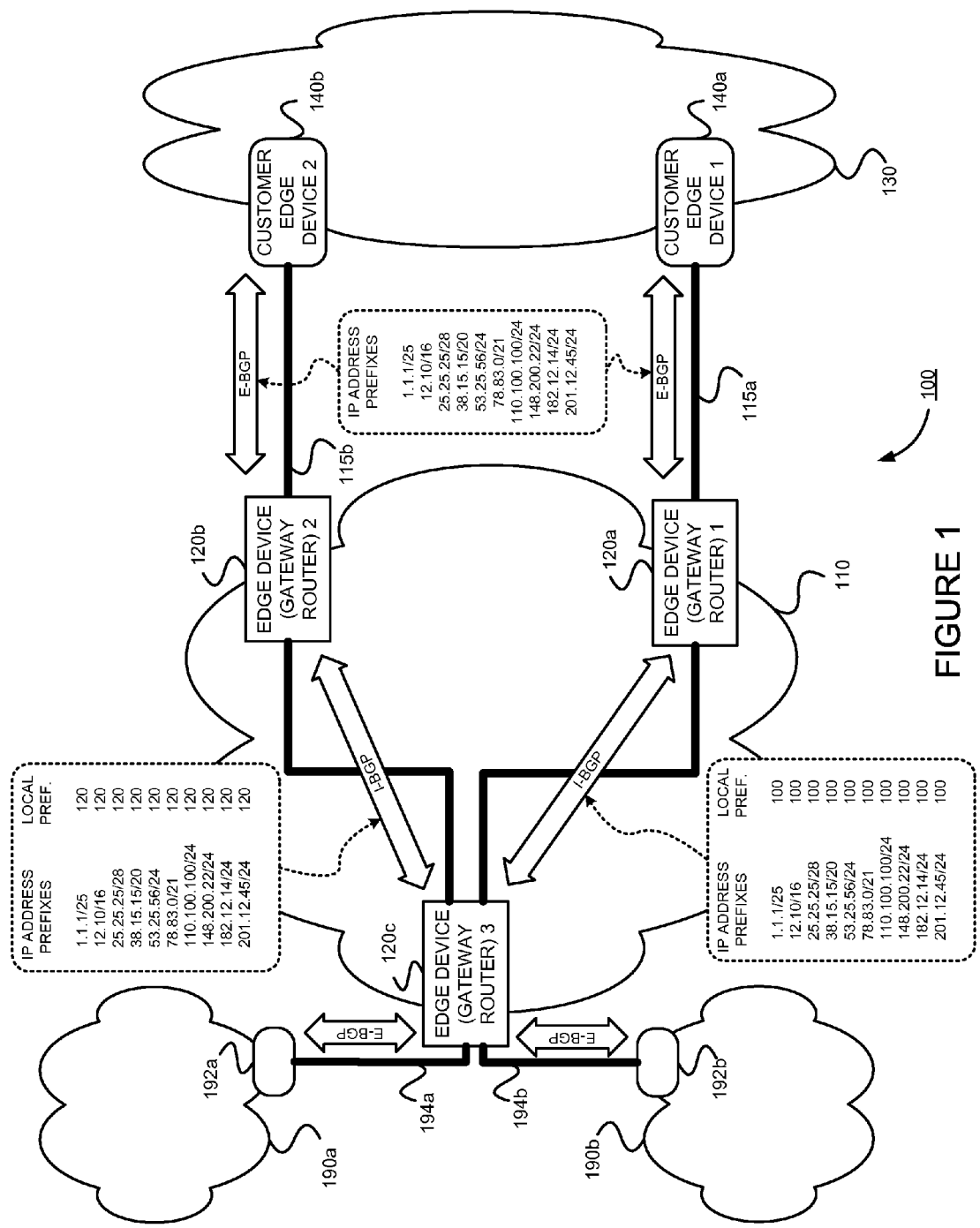
FIG. 1 illustrates an example environment in which example embodiments consistent with the present invention may be used.
Figure 10:
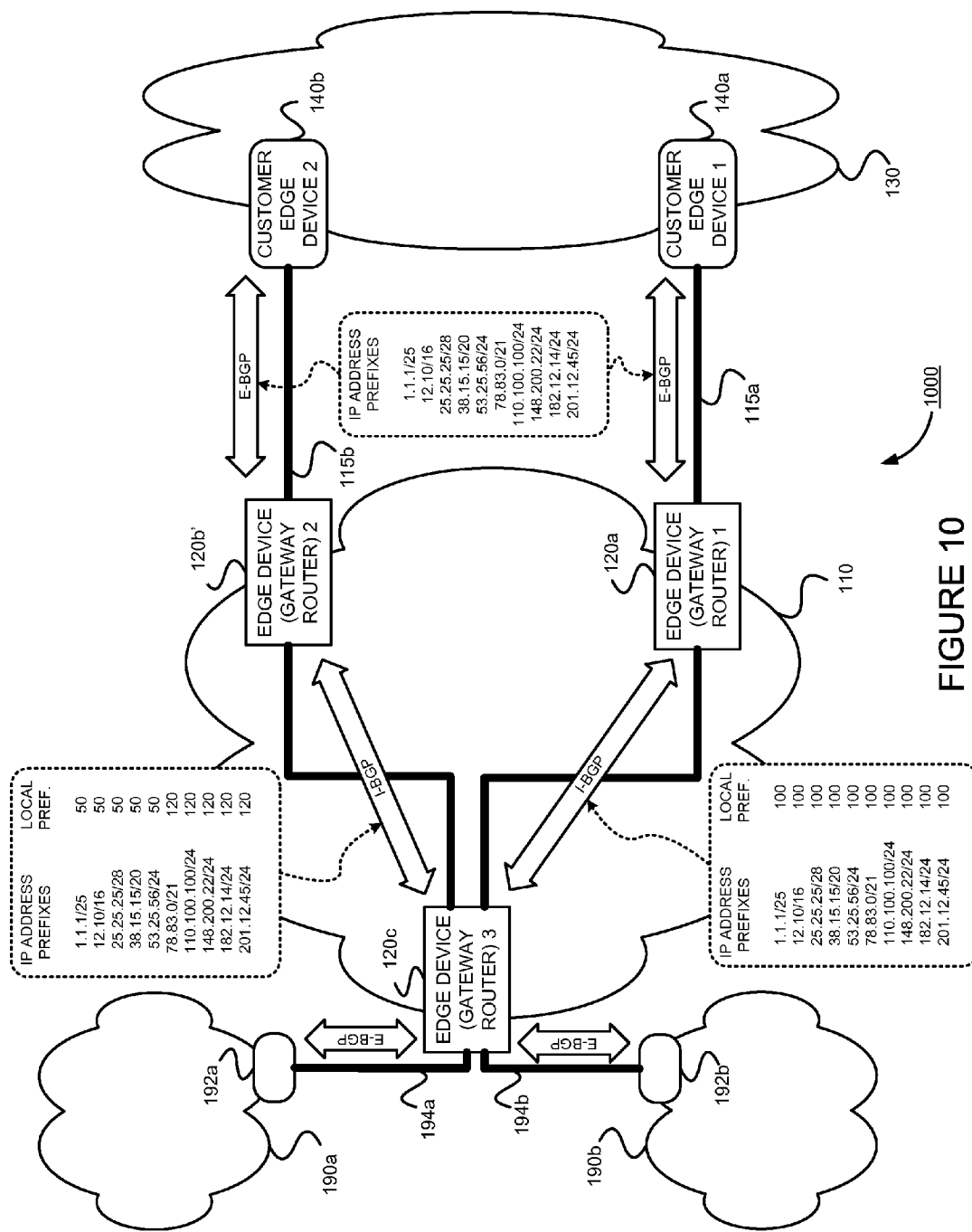
FIG. 10 is an example environment illustrating operations of an example method for providing a drop-sensitive prefix BGP path attribute modification.

FIG. 10 is an example environment 100' illustrating operations of an example method for providing a drop-sensitive prefix BGP path attribute modification. Referring back to FIG. 1, FIG. 10 depicts an environment 1000 in which an ISP 110 has two of its Gateway (GW) routers 120a, 120b having eBGP peering sessions with customer edge devices 140a, 140b of the same Enterprise customer 130. The ISP 110 advertises the network address prefixes of the Enterprise customer 130 internally to its other GW routers (e.g., 120c) through internal BGP (iBGP). Recall from FIG. 1 that, in accordance with BGP, the GW router 2 120b was used as the primary gateway for the Enterprise customer's network address prefixes (due to its higher LP values), while the GW router 1 120a was available as the backup (due to its lower LP values). This selection or configuration may be based on BGP path attributes such as local preference, AS path, origin, etc. In this example, it was assumed that BGP selected the GW router with the highest local preference (LP) value for a given network address prefix as the primary gateway for that prefix. Recall from FIG. 1, that since the GW router 2 120b had a higher local preference value than that of GW router 1 120a for all of the network address prefixes of the customer 130 (120>100), it was assumed that BGP used GW router 2 120b as the primary gateway for the network address prefixes of customer 130 (where GW router 1 120a was available as the backup gateway).

Still referring to FIG. 10, assume that the link 115b between the primary GW 120b' and the customer edge device (e.g., customer router) 140b experienced congestion, and a sufficient number (and/or rate) of data packets were being dropped at the output (e.g., the output queue) of the GW router 2 120b such that a "traffic offload condition" was met. (Recall YES branch of Condition 230.) Under this scenario, the GW router 2 120b' changes the local preference attributes of the first five IP address prefixes for the customer 130 from "120" to "50." (Although the first five, or the first 50%, of the IP address prefixes were selected for attribute change in this example, other ways of determining the number of IP address prefixes to have their attributes changed, and selecting which of the IP address prefixes are to have their attributes changed, are possible. In fact, as described above, such determinations and selections may be user configurable, for example. Also, the amount by which these values are dropped is user configurable.) The changed local preference attributes of the first five IP address prefixes for the customer 130 are communicated to the other routers (or gateway routers) of the AS 110 via iBGP. In this instance GW router 2 120b' communicates the changed attributes to (at least) GW router 3 120c. If GW router 3 120c uses the route with the highest BGP local preference, it will select GW router 1 120a for the first five IP address prefixes of customer 130 (since LP=100>LP=50), but will continue to select GW router 2 120b' for the last five IP address prefixes of the customer 130 (since LP=120>LP=100). Although not shown, if the link 115b remains congested and the "traffic offload condition" is still met due to dropped packets, the attributes of more of the IP address may be changed in one or more additional iterations of the method.

As can be appreciated from the foregoing example, example embodiments consistent with the present invention can offload traffic from an egress GW router by properly configuring the egress GW router and using BGP protocol.

§4.4. Refinements, Alternatives and Extensions

The foregoing example methods and apparatus can be implemented and extended in different ways. For example, the drop-sensitive BGP path attributes can be exchanged between GW routers as new BGP capabilities. As another example, analytics on the traffic (e.g., jflow provided by the JUNOS operating system used on Juniper routers) may be used to determine the particular prefix(es) that is driving the most amount of traffic. The traffic can be more intelligently separated (e.g., programmatically) using such information. The two foregoing extensions may be used by an external Orchestration/Control unit (such as the Juniper control system (JCS), for example), to make more holistic traffic optimizing decisions.

In at least some example embodiments consistent with the present invention, the service provider is notified of a problem through a community string for the problem prefix. Assume, for example, that when the prefix is identified, it is marked by a community string of 666:666 and is then re-advertised by the router 2. Under this example embodiment, the service provider will have a policy, which translates this string 666:666 to a "data-overload" problem in the network somewhere. The service provider can then find the origin of 666:666 and try to fix the problem manually. Here the advantage is the faster recognition of the problem and more reactive.

§4.5 Conclusions

As should be appreciated from the foregoing, example embodiments consistent with the present invention provide an improved solution to the problem of data packets dropped at an output (e.g., egress) of the first GW router (or more generally, a first edge device) while the first link between the first GW router and the first eBGP peer device (or more generally, a first customer edge device) of the second AS is still "up" and while an eBGP session between the first GW router and the first eBGP peer is still up. Such example embodiments avoid the need of a manually implemented, reactive, fix that is invoked only after the dropped data packets become very apparent to the customer.

Example embodiments consistent with the present invention can be implemented locally, even on a single router. (That is, unlike protocols such as RSVP, these example embodiments don't require the entire network (or entire AS) to have the same capabilities for support. Rather, mechanisms supported by the existing BGP protocol are exploited. Similarly, the example methods can be implemented without requiring two different networks to exchange any new attributes. Consequently, it is possible for a single vendor to implement it independent of other vendors.

What is claimed is:

1. A method in a system including a first autonomous system (AS) configured to have a first gateway router forward data associated with a set of Internet Protocol (IP) address prefixes, to a second AS via a first link to a first external border gateway protocol (eBGP) peer device of the second AS, the method comprising:
    a) receiving information about data packets dropped at an output of the first gateway router and associating the received information with the set of IP address prefixes;
    b) determining whether a data traffic offload condition exists using the received information;
    c) changing one or more path attributes of at least some of the IP address prefixes of the set, responsive to the determination that a data traffic offload condition exists, such that the first gateway router will be less likely to forward data associated with the at least some of the IP address prefixes of the set; and
    d) generating a BGP update message including the changed one or more path attributes for communication to at least one internal border gateway protocol (iBGP) peer device in the first AS.

2. The method of claim 1 wherein the first autonomous system is an Internet service provider and wherein the second autonomous system is a customer of the Internet service provider.

3. The method of claim 1 wherein the act of changing one or more path attributes of at least some of the IP address prefixes of the set such that the first gateway router will be less likely to forward data associated with the at least some of the IP address prefixes of the set includes changing a local preference BGP path attribute of at least some of the IP address prefixes of the set.

4. The method of claim 1 wherein the act of changing one or more path attributes of at least some of the IP address prefixes of the set such that the first gateway router will be less likely to forward data associated with the at least some of the IP address prefixes of the set includes decreasing a local preference BGP path attribute of at least some of the IP address prefixes of the set.

5. The method of claim 1 wherein the act of changing one or more path attributes of at least some of the IP address prefixes of the set such that the first gateway router will be less likely to forward data associated with the at least some of the IP address prefixes of the set includes changing at least one of (A) an AS path BGP path attribute, (B) an origin BGP path attribute, and (C) a communities BGP path attribute, of at least some of the IP address prefixes of the set.

6. The method of claim 1, further comprising generating, using an interface statistics counter, the received information about data packets dropped at the output of the first gateway router.

7. The method of claim 1, further comprising generating, using a management information base (MIB) of a simple network management protocol (SNMP), the received information about data packets dropped at an output of the first gateway router.

8. The method of claim 1 wherein the act of determining whether the "data traffic offload" condition exists using the received information includes determining whether (A) a measured dropped packet per time period value, or (B) a measured dropped byte per time period value, included in the received information exceeds a predetermined parameter.

9. The method of claim 8 wherein (A) a measured dropped packet per time period value, or (B) a measured dropped byte per time period value, is taken from an output queue of the first gateway router.

10. The method of claim 8 wherein (A) a measured dropped packet per time period value, or (B) a measured dropped byte per time period value, is taken from an output interface of the first gateway router.

11. The method of claim 1 wherein the at least some of the IP address prefixes of the set consist of a predetermined number of the IP address prefixes.

12. The method of claim 1 wherein the at least some of the IP address prefixes of the set consist of a predetermined percentage of the IP address prefixes.

13. The method of claim 1 wherein the at least some of the IP address prefixes of the set are selected randomly.

14. The method of claim 1 wherein the at least some of the IP address prefixes of the set are selected in accordance with a predefined heuristic.

15. The method of claim 14 wherein the predefined heuristic considers an amount of traffic destined for each of the IP address prefixes of the set.

16. The method of claim 1 wherein the acts of (a) receiving, (b) determining, (c) changing, and (d) generating are all performed locally, on the first gateway router.

17. The method of claim 1 wherein the act of changing one or more path attributes of the at least some of the IP address prefixes of the set, responsive to the determination that the data traffic offload condition exists, such that the first gateway router will be less likely to forward data associated with the at least some of the IP address prefixes of the set, is performed by a centralized control unit external to the first gateway router.

18. The method of claim 1 further comprising sending, by the first gateway router, a packet drop sensitive BGP attribute as a BGP capability to at least one of the at least one iBGP peer.

19. A method in a system including a first autonomous system (AS) configured to have a first edge device forward data associated with a set of Internet Protocol (IP) address prefixes, to a second AS via a first link to a first border device of the second AS, the method comprising:
   a) receiving information about data packets dropped at the output of the first edge device and associating the received information with the set of IP address prefixes;
   b) determining whether a data traffic offload condition exists using the received information;
   c) changing one or more attributes of at least some of the IP address prefixes of the set, responsive to the determination that a data traffic offload condition exists, such that the first edge device will be less likely to forward data associated with the at least some of the IP address prefixes of the set; and
   d) outputting the changed one or more attributes for communication to at least one other data forwarding device of the first AS.

20. A first gateway router configured to forward data associated with a set of IP address prefixes to an external autonomous system (AS) system via a first link to a first external border gateway protocol (eBGP) peer device of the external AS, the first gateway router comprising:
   a) at least one processor; and
   b) a storage device storing processor-executable instructions which, when executed by the at least one processor, cause the at least one processor to perform a method including
      1) receiving information about data packets dropped at an output of the first gateway router and associating the received information with the set of IP address prefixes;
      2) determining whether a data traffic offload condition exists using the received information;
      3) changing one or more path attributes of at least some of the one or more of the IP address prefixes of the set, responsive to the determination that a data traffic offload condition exists, such that the first gateway router will be less likely to forward data associated with the at least some of the one or more IP address prefixes of the set; and
   d) generating a BGP update message including the changed one or more path attributes for communication to at least one internal border gateway protocol (iBGP) peer device.

* * * * *